O. REDMOND.
GLARE SHIELD.
APPLICATION FILED MAR. 17, 1916.
1,306,626. Patented June 10, 1919.
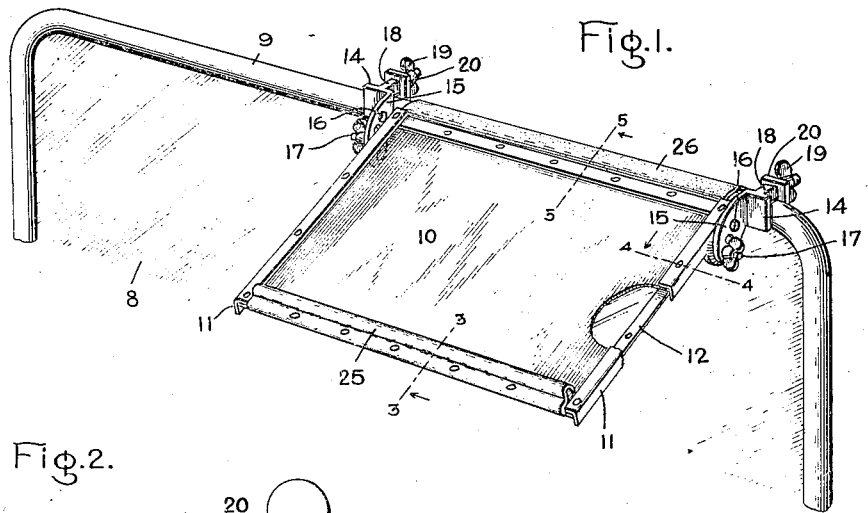
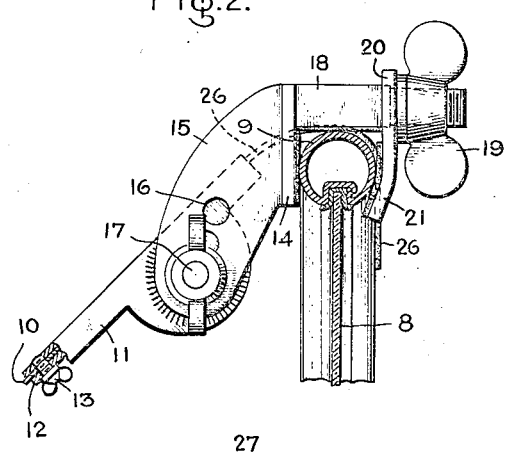
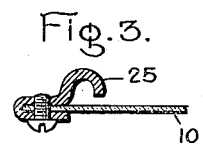
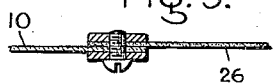
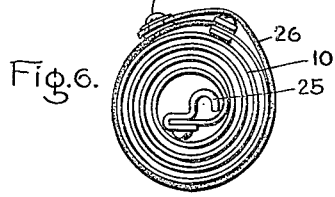
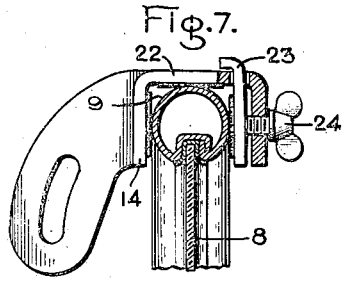
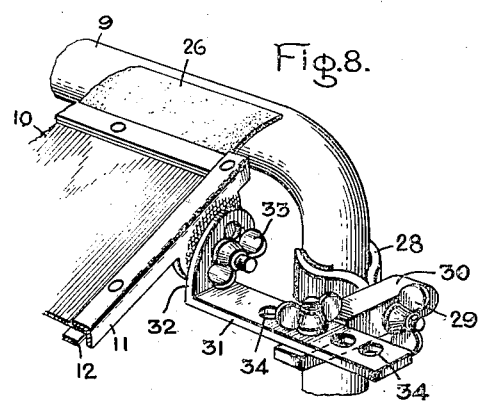
Inventor:
Olney Redmond,
by
Charles McClair
His Attorney.

UNITED STATES PATENT OFFICE.

OLNEY REDMOND, OF SCHENECTADY, NEW YORK.

GLARE-SHIELD.

1,306,626.

Specification of Letters Patent.  Patented June 10, 1919.

Application filed March 17, 1916. Serial No. 84,961.

*To all whom it may concern:*

Be it known that I, OLNEY REDMOND, a citizen of the United States, residing at Schenectady, county of Schenectady, State of New York, have invented certain new and useful Improvements in Glare-Shields, of which the following is a specification.

One of the greatest risks encountered in driving any vehicle at night is the probability that at some critical moment the driver will be practically blinded by dazzling light or glare from some powerful light in front of him, such as an arc lamp, or the headlight of an automobile, street car, or similar vehicle. This danger is especially great where, as in driving automobiles, the driver must always guide and control the vehicle. A strong light, such as a powerful automobile lamp, or street car headlight, exerts a marked blinding or dazzling effect on an observer looking directly at it, even though it is a great distance away, and this blinding effect persists until the observer is within such a short distance of the light that he is able to see beyond it.

The object of my invention is to provide for the driver of an automobile or similar vehicle a simple and easily attached shade or device which enables the driver, without moving either his head or the device, to protect his eyes when looking toward strong lights and at the same time always have a perfectly clear and unobstructed field of view of the road immediately in front of the vehicle. A further object is to provide a device of this character which can be easily attached to a vehicle when required and when no longer needed can be quickly detached and safely stored away in a very small space. Another object is to provide a device of this character which is very light in weight and so constructed that the shade can be rolled up into very compact form and stored away in a manner which prevents injury while stored.

To this end I provide a shade of some translucent or dark colored material, such as colored celluloid, with means for adjustably securing it to the vehicle in front of the windshield in such a position that when the driver is in his place he looks through the shade at all lights in a position to dazzle his eyes, but looks under the shade at the road directly in front of the vehicle. As a result he always has a clear and unobstructed view of the road and at the same time his eyes are always protected against glare. This shade is preferably made of flexible material so that it can be rolled up into a compact roll which can be stored in a minimum of space. It is preferably mounted with its upper edge in snug engagement with the windshield to form a sort of pocket in which the air is quiet and into which dust and similar material is not carried by the air currents due to movement of the vehicle, so that the portion of the windshield beneath the shade is kept clear and free.

My invention will be best understood in connection with the accompanying drawing in which merely for purposes of illustration I have shown one of the various forms in which my invention may be embodied and in which Figure 1 is a perspective view showing one form of my device applied to the windshield of an automobile; Fig. 2 is an end view of the device shown in Fig. 1 with the windshield shown in transverse section; Fig. 3 is a transverse section of the lower edge on the line 3—3; Fig. 4 is a section of the side bracket on the line 4—4; Fig. 5 is a section of the upper edge of the shade on the line 5—5; Fig. 6 is an end view of the shade rolled up for purposes of storage and transportation; Fig. 7 is a view similar to Fig. 2 but showing a modification in the clamp; and Fig. 8 is a view of a clamp for attachment to a vertical part of the vehicle.

In the particular form of device shown in the drawing a windshield 8 of the usual type and having a rim 9 is provided with a shade 10 preferably made of green celluloid or similar flexible translucent material, which will shield the eyes of the driver from glare. The shade 10 is supported in front of the windshield by means of adjustable brackets 11, to which the shade 10 is detachably secured by some easily detachable fastening device, such as binding strips 12 clamped down upon the shade by thumb screws 13. The brackets 11 are set at any desired angle by means of suitable clamping devices which adjustably hold the brackets to the vehicle and hold the screen in the proper position. In the particular form of device shown in Fig. 1 the brackets are clamped to the top rail or rim 9 of the windshield, but may be attached to the side of the windshield, or to any other part of the vehicle, such as the front of the top, as long as the shade is suspended in front of the driver and in front of the windshield in the proper position to secure the desired result.

One form of clamp or attaching device for holding the screen in position is illustrated in Fig. 1 in which a fixed clamping jaw 14 is provided with a lug 15 having one or more holes 16 to receive bolts 17 provided with thumb nuts for clamping the brackets 11 to the lugs 15 at any desired angle. The contacting surfaces of the lugs 15 and brackets 11 are preferably roughened or serrated, as shown in Fig. 2, to make a secure friction joint and hold the brackets in place. The fixed clamping jaw 14 is also provided with a post 18, preferably square in cross section, and threaded at one end to receive a thumb nut 19. On this post a coöperating loose jaw 20 is slidably mounted and is moved into position by the thumb nut 19 to grip some suitable part of the vehicle such as the top rail 9 of the windshield, as shown in Fig. 2. The rail of the windshield or other part of the vehicle which is engaged by the clamps can, if desired, be protected by means of felt or rubber pads on the jaws of the clamp, as illustrated in Fig. 2. I also prefer to provide the jaw 20 with an inclined surface 21 so set that the more the clamp is tightened the more the post 18 is drawn down against the top of the rail of the windshield.

In some cases I prefer to use the modified form of clamp shown in Fig. 7, in which the jaw 14 is provided with a yoke 22 and coöperates with a loose jaw 23 pressed toward the other jaw 14 by means of a thumb nut 24 threaded into the yoke 22.

The shade 10 is set in front of the driver with its lower edge spaced away from the windshield and in such a position that the driver, without moving his head, obtains a clear view of the road directly in front of the machine by looking under the shade, but in viewing the more distant road he looks through the translucent shade. Without having to move his head, or to move or adjust the screen 10 in any way, he has a clear view of that portion of the road immediately in front of him, while at the same time his eyes are always shielded from the glare of lights in front of him as long as they are at a sufficient distance to blind the eye.

For further protection of that part of the windshield through which the driver views the road the lower edge of the shade is provided with a gutter 25 preferably made of metal and detachably secured to the lower ends of the brackets 11. Any water running down the shade will accumulate in the gutter 25 and be carried off at one edge of the shade instead of dripping off all along the edge and being swept back under the shade and up onto the glass of the windshield. This gutter also stiffens and supports the lower edge of the shade. It is desirable to maintain a very snug engagement between the upper edge of the shade 10 and the windshield by some suitable means as, for example, a strip or apron 26, of rubber, or similar material, attached to the shade to fit snugly against the glass of the windshield or to go over the top rail of the windshield. This apron not only prevents rain from entering between the upper edge of the shade 10 and the windshield, but also prevents the escape of air from beneath the shade, which forms a sort of pocket in which the air is quiet. The device can be stored in a very small compass by disconnecting the shade from the brackets 11 and then rolling it up around the lower edge of gutter 25 as a center, as shown in Fig. 6. The rubber strip or apron 26 is preferably made wide enough to act as a cover for the rolled up shade 10 and is provided with fasteners 27, similar to glove fasteners, for holding the free edge of the apron in place when the shade is rolled up. The rolled up shade can be stored either as a roll, with the apron 26 forming a cover, or put into a protecting case of metal or similar material.

When the shade is to be supported from the side of the windshield or any similar vertical part of the vehicle, I prefer to use the attachment shown in Fig. 8, in which clamping jaws 28 drawn into place by a thumb nut 29 grip the side of the windshield and hold in place a support 30. On the outer end of the support 30 I secure an adjustable arm 31 provided with a perforated lug 32 to which the brackets 11 can be attached in the same way as they are attached to the lug 15 of the clamp shown in Fig. 2. This arm is adjustably connected to the support in any suitable way, as, for example, by means of a bolt and nut 33. To permit adjustment of the arm to the proper position it may be provided with holes 34 suitably spaced.

My invention is applicable not only to automobiles but to trolley cars and to any similar vehicles in which the driver is normally behind a glass window or windshield. It is very easily attached or detached at will, can be folded up into a very small compass, and when folded is practically immune from injury.

What I claim is:

1. In a device of the character described for attachment to a windshield, the combination of a frame comprising two brackets each perforated near one end, a translucent sheet adapted to intercept glare and secured to said frame, two clamping jaws each having a clamping face with a post projecting perpendicularly from said face and a flat perforated lug projecting from the back of said jaw perpendicularly to the plane of said face, two coöperating jaws movable along said posts, means for holding said latter jaws in clamping relation to said clamping faces, and bolts extending through said perforated lugs and the perforated ends of said brackets to clamp said brackets to said lugs and hold said frame projecting downward and in front of the windshield with said sheet in the field of view of the driver.

2. In a device of the character described, a fixed clamping jaw having a clamping face, a post projecting perpendicularly from said face, and a flat perforated lug projecting from the back of said jaw perpendicularly to the plane of said face, a loose clamping jaw slidably mounted on said post, means for holding said loose jaw in clamping relation to said fixed jaw, a frame comprising a bracket perforated near one end, a bolt extending through the perforated end of said frame and through said lug to clamp said end to the flat side of said lug and thereby hold said frame in adjusted position, a sheet of translucent material suitable for intercepting glare and having a flexible waterproof strip along one edge, and means for detachably securing said sheet to said frame with said strip projecting beyond the perforated end of said bracket.

3. In a device of the character described a clamping jaw having a perforated lug and a threaded post, a thumb nut for said post, a coöperating jaw slidable on said post, a perforated bracket, means for adjustably clamping said bracket to said lug, a flexible sheet of celluloid, and fastening means for enabling said sheet to be attached or detached from said bracket at will.

In witness whereof I have hereunto set my hand this 15 day of March, 1916.

OLNEY REDMOND.